United States Patent
Okamura et al.

(10) Patent No.: US 12,378,426 B2
(45) Date of Patent: Aug. 5, 2025

(54) INK JET INK COMPOSITION

(71) Applicant: SEIKO EPSON CORPORATION, Tokyo (JP)

(72) Inventors: Hisashi Okamura, Shiojiri (JP); Hidehiko Komatsu, Chino (JP); Hiromi Noguchi, Shiojiri (JP); Yuzuka Kumagai, Shiojiri (JP); Yasuhiro Oki, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 302 days.

(21) Appl. No.: 18/127,702

(22) Filed: Mar. 29, 2023

(65) Prior Publication Data
US 2023/0392030 A1    Dec. 7, 2023

(30) Foreign Application Priority Data

Mar. 30, 2022   (JP) .................. 2022-055314

(51) Int. Cl.
*C09D 11/32* (2014.01)
*B41J 2/01* (2006.01)
(Continued)

(52) U.S. Cl.
CPC .......... *C09D 11/32* (2013.01); *B41J 2/01* (2013.01); *B41J 2/2107* (2013.01); *C09D 11/00* (2013.01); *C09D 11/30* (2013.01); *C09D 11/328* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,611,821 A * 3/1997 Huang .................... D06P 1/384
                                                             8/549
6,302,949 B1 * 10/2001 Peter .................... C09D 11/328
                                                             534/602

(Continued)

FOREIGN PATENT DOCUMENTS

JP    2012-153754 A    8/2012

*Primary Examiner* — Manish S Shah
(74) *Attorney, Agent, or Firm* — Harness, Dickey & Pierce, P.L.C.

(57) ABSTRACT

An ink jet ink composition includes a coloring material, a water-soluble organic solvent, and water. The coloring material contains a compound (A) having Cr (chromium) as Me in a structure represented by formula (1) below, and a compound (B) having Co (cobalt) as Me in the structure
(Continued)

represented by the formula (1) below, and the mass ratio of the compound (B) to the compound (A) is over 0 and 0.06 or less.

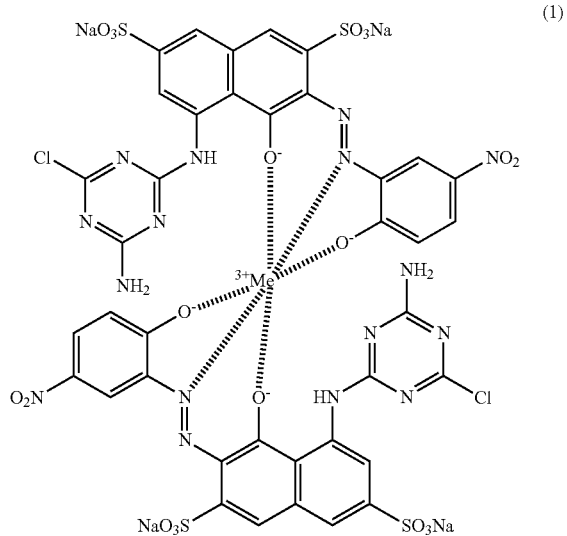

(1)

5 Claims, 1 Drawing Sheet

(51) Int. Cl.
*B41J 2/21* (2006.01)
*C09D 11/00* (2014.01)
*C09D 11/30* (2014.01)
*C09D 11/328* (2014.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2004/0216638 | A1* | 11/2004 | Rolly | B41J 2/2114 106/31.86 |
| 2005/0160937 | A1* | 7/2005 | Gremaud | C09D 11/40 106/31.51 |
| 2009/0027612 | A1* | 1/2009 | Tomita | G02B 5/3016 349/182 |
| 2020/0399491 | A1* | 12/2020 | Wakushima | C09D 11/328 |

* cited by examiner

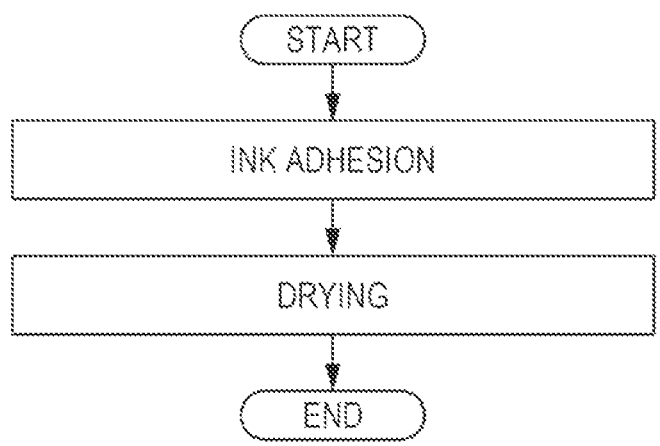

INK JET INK COMPOSITION

The present application is based on, and claims priority from JP Application Serial Number 2022-055314, filed Mar. 30, 2022, the disclosure of which is hereby incorporated by reference herein in its entirety.

BACKGROUND

1. Technical Field

The present disclosure relates to an ink jet ink composition.

2. Related Art

An ink jet method is attempted to be applied to not only recording of an image on a recording medium but also printing on a fabric, and various ink compositions for ink jet textile printing are investigated. For example, JP-A-2012-153754 describes an ink jet ink composition for textile printing having color development and fastness caused by specifying the types of an anti-rust agent and a pH adjuster.

However, the ink jet ink composition for textile printing described in JP-A-2012-153754 has the problem of poor color development and light resistance when containing C. I. Reactive Black 8 as a coloring material and causing nozzle clogging due to head drying after long-term storage.

SUMMARY

According to an aspect of the present disclosure, an ink jet ink composition contains a coloring material, a water-soluble organic solvent, and water. The coloring material contains a compound (A) containing Cr (chromium) as Me in a structure represented by formula (1) below, and a compound (B) containing cobalt (Co) as Me in the structure represented by the formula (1) below, and the mass ratio (the compound (B)/the compound (A)) of the compound (B) to the compound (A) is over 0 and 0.06 or less.

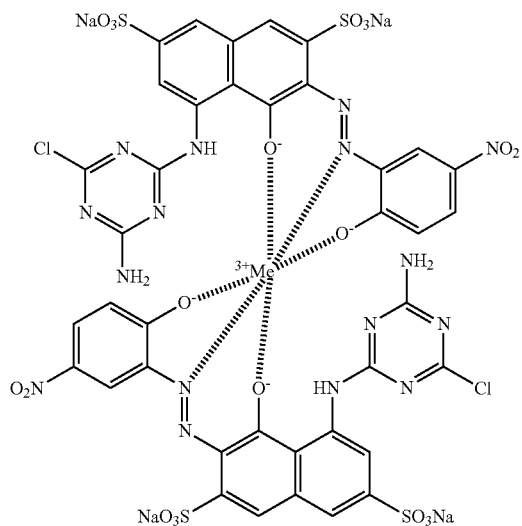

BRIEF DESCRIPTION OF THE DRAWING

FIGURE is a flow chart showing an example of a recording method according to an embodiment of the present disclosure.

DESCRIPTION OF EXEMPLARY EMBODIMENTS

An embodiment of the present disclosure (referred to as a "present embodiment" hereinafter) is described in detail below, but the present disclosure is not limited to this, and various modifications can be made within a range not deviating from the gist of the present disclosure.

1. Ink Jet Ink Composition

An ink jet ink composition (also referred to as an "ink composition" hereinafter) according to the present embodiment contains a coloring material, a water-soluble organic solvent, and water. The coloring material contains a compound (A) containing Cr (chromium) as Me in a structure represented by formula (1) below, and a compound (B) containing cobalt (Co) as Me in the structure represented by the formula (1) below, and the mass ratio (the compound (B)/the compound (A)) of the compound (B) to the compound (A) is over 0 and 0.06 or less.

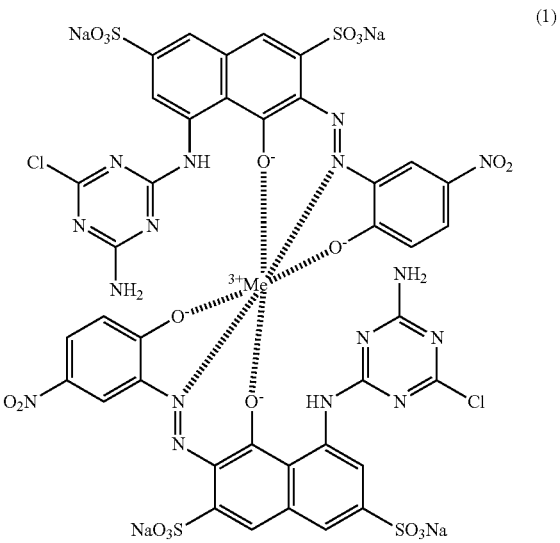

The present embodiment can provide the ink composition having excellent color development and light resistance and can suppress nozzle clogging and improve the clogging recovery property even when a head is dried after long-term storage.

The reason why the excellent effect can be obtained by the present embodiment is not known, but the present inventors suppose as follows.

An ink jet ink composition containing a coloring material, for example, C. I. Reactive Black 8, containing the compound (A) and the compound (B) has poor color development and light resistance and causes nozzle clogging due to drying of a head after long-term storage.

The compound (A) has high color development and high solubility in a solvent such as water and thus has the excellent clogging recovery property, but the light resistance tends to be poor due to the excellent solubility. Also, the compound (B) has excellent light resistance, but has very poor solvent solubility and tends to have poor color development.

However, the coloring material according to the present embodiment contains the compound (A) and the compound (B), and the mass ratio thereof is within a specific range. Therefore, it is supposed that the synergistic effect of the compound (A) and the compound (B) can be exhibited, and thus the ink composition having excellent color development, light resistance, and clogging recovery property can be obtained. However, the reason is not limited to this.

Next, each of the components contained in the ink composition is described.

1. 1. Coloring Material

The ink composition contains, as the coloring material, the compound (A) containing Cr as Me in a structure represented by the formula (1), and the compound (B) containing Co as Me in the structure represented by the formula (1). In the coloring material, the mass ratio (the compound (B)/the compound (A)) of the compound (B) to the compound (A) is over 0 and 0.06 or less. Such a coloring material is a reactive dye. Coloring materials may be used alone or in combination of two or more.

Because the ink composition having more excellent color development, light resistance, and clogging recovery property can be obtained, the mass ratio (compound (B)/compound (A)) of the compound (B) to the compound (A) is preferably 0.005 or more and 0.06 or less.

The coloring material preferably further contains a compound (C) having a structure represented by formula (2) below, and the mass ratio (compound (A)+compound (B))/compound (C)) of the compound (A) and the compound (B) to the compound (C) is 4 or more and 20 or less. The coloring material may contain one compound (C) or two or more compounds (C).

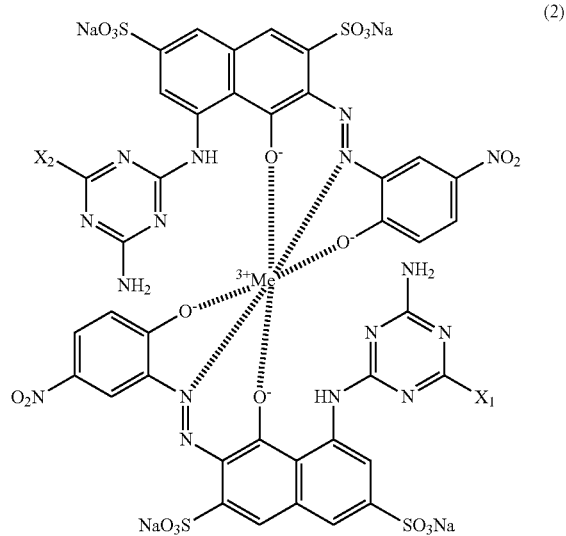

(2)

In the formula (2), Me is Cr or Co, and $X_1$ and $X_2$ are each independently a chlorine atom or an amino group. However, $X_1$ and $X_2$ are not simultaneously chlorine atoms.

When the coloring material contains the compound (C) in combination with the compound (A) and the compound (B) at a specific mass ratio (compound (A)+compound (B))/compound (C)), there is a tendency that the coloring material has more excellent light resistance and clogging recovery property and is even more excellent in color development for fabrics containing one or more of cotton and silk as raw yarns (simply referred to as "cotton and silk fabrics" hereinafter). In particular, the color development for silk tends to be even further more excellent. The reason for this is not known, but the inventors suppose as follows.

That is, good color development can be obtained by having simultaneously chlorine atoms as $X_1$ and $X_2$ in the structure represented by the formula (2). On the other hand, in the compound (C), $X_1$ and $X_2$ are not simultaneously chlorine atoms, but one of $X_1$ and $X_2$ is a chlorine atom, and the other is an amino group, or both are amino groups. Therefore, good color development tends to be not obtained, but adhesion to cotton and silk fabrics is excellent. In addition, the compound (C) has good affinity for the compound (A) and the compound (B). Thus, when the compound (C) is used in combination with the compound (A) and the compound (B) at a specific mass ratio, the synergetic effect with the compound (A) and the compound (B) can be more exhibited. Consequently, it is supposed that the ink composition having particularly excellent color development can be obtained. However, the reason is not limited to this.

Because of the tendency to have even more excellent light resistance and clogging recovery property and even further more color development for cotton and silk fabrics, Me in the formula (2) is preferably Cr.

Because of the tendency to have more excellent light resistance and clogging recovery property and even further more excellent color development for cotton and silk fabrics, $X_1$ and $X_2$ in the formula (2) preferably simultaneously amino groups.

In the present embodiment, the coloring material can be obtained by purifying commercial C. I. Reactive Black 8 using a known method. Examples of the purification method include activated carbon filtration, microfiltration, and ultrafiltration. In order to perform purification more securely, for example, after dissolution of C. I. Reactive Black 8 in water, pretreatment such as pH adjustment and ion exchange of heavy metals is preferably performed before purification.

The mass ratio of the compound (A), the compound (B), and the compound (C) can be calculated by using, for example, liquid chromatography-mass analyzer (LC-MS), nuclear magnetic resonance apparatus (NMR), and Fourier transform infrared spectrophotometer (FT-IR). The mass ratio of the compound (B) to the compound (A) can be calculated by using, for example, an inductively coupled plasma-optical emission spectrometer (ICP-OES) and an X-ray fluorescence (XRF) analyzer. The mass ratio of the compound (A) and the compound (B) to the compound (C) can be calculated by using liquid chromatography-mass analyzer (LC-MS), a nuclear magnetic resonance apparatus (NMR), and a Fourier transform infrared spectrophotometer (FT-IR).

Because the ink composition having more excellent color development and light resistance and even more excellent clogging recovery property can be obtained, the content of the coloring material relative to the total amount of the ink composition is preferably 30% by mass or less, more preferably 20% by mass or less, still more preferably 15% by mass or less, even still more preferably 10% by mass or less, even further still more preferably 7% by mass or less, and further preferably 5% by mass or less. The lower limit of the content of the coloring material is not limited as long as the operation and effect of the present embodiment are exhibited, but the lower limit relative to the total amount of the ink composition may be, for example, 0.1% by mass or more, 0.5% by mass or more, or 1% by mass or more.

1. 2. Water-Soluble Organic Solvent

The ink composition contains the water-soluble organic solvent.

Examples of the water-soluble organic solvent include glycerin; glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, and 1,6-hexanediol; glycol monoethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, and triethylene glycol monobutyl; and alcohols such as methanol, ethanol, n-propyl alcohol, isopropyl alcohol, n-butanol, 2-butanol, tert-butanol, iso-butanol, n-pentanol, 2-pentanol, 3-pentanol, and tert-pentanol. The water-soluble organic solvents may be used alone or in combination of two or more.

Among these, glycols can function as a moisturizer. In addition, glycol monoethers can function as a penetrant.

From the viewpoint of more effectively and securely exhibiting the operation and effect of the present embodiment, the content of the water-soluble organic solvent relative to the total amount of the ink composition is preferably 5% by mass or more and 30% by mass or less in total.

1. 3. Water

The ink composition contains water.

Examples of the water include pure water such as ion exchange water, ultrafiltered water, reverse osmosis water, distilled water, and the like, and ultrapure water from which ionic impurities are removed as much as possible. Also, water sterilized by ultraviolet irradiation, addition of hydrogen peroxide, or the like is preferred because the occurrence of molds and bacteria can be suppressed when a treated liquid composition is stored for a long time.

The content of water relative to the total amount of the ink composition is preferably 30% by mass or more and 80% by mass or less. When the content of water is within the range described above, an increase in viscosity of the ink composition can be suppressed.

1. 4. Other Reactive Dye

The ink composition may contain another reactive dye.

Examples of the reactive dye include C. I. Reactive Orange 1, 2, 4, 5, 7, 11, 12, 13, 15, 16, 20, 30, 35, 56, 64, 67, 69, 70, 72, 74, 82, 84, 86, 87, 91, 92, 93, 95, 99, and 107; C. I. Reactive Red 2, 3, 3:1, 4, 5, 7, 8, 11, 12, 13, 15, 16, 21, 22, 23, 24, 24:1, 25, 26, 28, 29, 31, 32, 33, 35, 39, 40, 41, 43, 45, 46, 49, 55, 56, 58, 59, 65, 66, 78, 83, 106, 111, 112, 113, 114, 116, 120, 123, 124, 128, 130, 136, 141, 147, 158, 159, 171, 174, 176, 180, 183, 184, 187, 190, 193, 194, 195, 198, 218, 220, 222, 223, 226, 228, 235, and 245; C. I. Reactive Yellow 2, 3, 6, 7, 12, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, 176, and 181; C. I. Reactive Blue 2, 3, 4, 5, 7, 13, 14, 15, 19, 21, 25, 26, 27, 28, 29, 38, 39, 40, 41, 46, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, and 236; C. I. Reactive Black 1, 2, 3, 5, 8, 12, 13, 14, 31, 34, and 39; C. I. Reactive Violet 1, 2, 4, 5, 6, 22, 23, 33, 36, and 38; C. I. Reactive Green 5, 8, 12, 15, 19, and 21; and C. I. Reactive Brown 1, 2, 7, 8, 9, 11, 14, 17, 18, 19, 21, 23, 31, 37, 43, and 46. The other reactive dyes may be used alone or in combination of two or more.

Because the ink composition has more excellent color development, light resistance, and clogging recovery property and can realize a particularly good gray color, the ink composition preferably contains any one or more selected from C. I. Reactive Orange 13, C. I. Reactive Orange 99, C. I. Reactive Yellow 95, C. I. Reactive Red 245, C. I. Reactive Brown 11, C. I. Reactive Blue 49, C. I. Reactive Orange 12, and C. I. Reactive Red 24:1, and more preferably contains Reactive Orange 12 and/or C. I. Reactive Red 24:1.

Because the ink composition has still more excellent color development, light resistance, and clogging recovery property and can realize a particularly better gray color, the content of the other reactive dye relative to the total amount of the ink composition is preferably 0.01% by mass or more and 20% by mass or less and more preferably by mass or more and 10% by mass or less. Also, the content is preferably 0.5% by mass or more and 10% by mass or less.

1. 5. Surfactant

The ink composition may contain a surfactant.

The surfactant has the function of adjusting wettability to a recording medium by decreasing the surface tension of the ink composition. Examples of the surfactant include an acetylene glycol-based surfactant, a silicone-based surfactant, and a fluorine-based surfactant.

Examples of the acetylene glycol-based surfactant include Surfynol (registered trademark) 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (manufactured by Nissin Chemical Industry Co., Ltd.); Olfine (registered trademark) B, Y, P, A, STG, SPC, E1004, E1010, PD-001, PD-002W, PD-003, PD-004, EXP.4001, EXP.4036, EXP.4051, AF-103, AF-104, AK-02, SK-14; and AE-3 (manufactured by Nissin Chemical Industry Co., Ltd.); and Acetylenol (registered trademark) E00, E00P, E40, and E100 (manufactured by Kawaken Fine Chemicals Co., Ltd.).

Examples of the silicone-based surfactant include polysiloxane-based compounds such as polyether-modified organosiloxane and the like. Examples of a commercial product of polyether-modified organosiloxane include BYK-306, BYK-307, BYK-333, BYK-341, BYK-345, BYK-346, and BYK-348 (manufactured by BYK Chemie Japan K. K.), KF-351A, KF-352A, KF-353, KF-354L, KF-355A, KF-615A, KF-945, KF-640, KF-642, KF-643, KF-6004, KF-6020, X-22-4515, KF-6011, KF-6012, KF-6015, and KF-6017 (manufactured by Shin-Etsu Chemical Co., Ltd.).

Examples of the fluorine-based surfactant include a fluorine-modified polymer, for example, BYK-340 (manufactured by BYK Chemie Japan K. K.).

The surfactants may be used alone or in combination of two or more.

Because the ink composition has more excellent color development, light resistance, and clogging recovery property, the content of the surfactant relative to the total amount of the ink composition is preferably 0.01% by mass or more and 10% by mass or less, more preferably 0.05% by mass or more and 5.0% by mass or less, and still more preferably 0.1% by mass or more and 1.0% by mass or less.

1. 6. Preservative

The ink composition may contain a preservative. The preservative also functions as an anti-mold agent. Preservatives may be used alone or in combination of two or more.

Examples of the preservative include sodium benzoate, sodium pentachlorophenol, sodium 2-pyridientiol-1-oxide, sodium sorbate, sodium dehydroacetate, 1,2-dibenzoisothiazolin-3-one, 4-chloro-3-methylphenol (Bayer Corporation Preventol CMK and the like), and the like.

A commercial product can also be used as the preservative. Examples of a commercial product include Proxel (registered trademark) series CRL, BND, GXL, XL-2, and TN (above tradenames, Lonza Japan Ltd.); and Preventol (registered trademark) CMK (Bayer Corporation).

Because the ink composition has more excellent color development, light resistance, and clogging recovery property, the content of the preservative relative to the total amount of the ink composition is preferably 0.01% by mass or more and 10% by mass or less, more preferably 0.03% by mass or more and 5.0% by mass or less, and still more preferably 0.05% by mass or more and 1.0% by mass or less.

1. 7. Other Component

The ink composition may contain various additives, which can be generally used in the ink composition, such as a solubilizer, a viscosity modifier, a pH adjuster, an antioxidant, an ultraviolet absorber, an oxygen absorber, an antirust agent, a corrosion inhibitor, and a chelating agent. The additives may be used alone or in combination of two or more.

Because the ink composition has more excellent color development, light resistance, and clogging recovery property, the content of the additives relative to the total amount of the ink composition is preferably 0.01% by mass or more and 10% by mass or less in total.

1. 8. Physical Properties of Ink Composition

The viscosity of the ink composition at 20° C. is preferably 1.5 mPa·s or more and 15 mPa·s or less, more preferably 1.5 mPa·s or more and 7 mPa·s or less, and still more preferably 1.5 mPa·s or more and 5.5 mPa·s or less.

From the viewpoint of making wetting spreadability on a recording medium appropriate, the upper limit of surface tension at 25° C. of the ink composition is preferably 40 mN/m or less, more preferably 38 mN/m or less, still more preferably 35 mN/m or less, even still more preferably 32 mN/m or less, and particularly preferably 30 mN/m or less. From the same viewpoint, the lower limit of the surface tension is preferably 15 mN/m or more, more preferably 20 mN/m or more, still more preferably 25 mN/m or more, and even still more preferably 27 mN/m or more. In the present specification, the surface tension can be measured as surface tension when a platinum plate is wet with the composition at room temperature and normal pressure using surface tensiometer CBVP-Z (tradename manufactured by Kyowa Interface Science Co., Ltd.).

When the surface tension of the ink composition is within the range described above, ejection stability and initial filling property in ink jet recording can be more improved.

1. 9. Method for Producing Ink Composition

The ink composition can be prepared by mixing the coloring material, the water-soluble organic solvent, water, and, if required, the surfactant, he preservative, and other components in any desired order, and if required, removing impurities and foreign materials by filtration or the like. A method used as a method for mixing the components includes, for example, sequentially adding and stirring the components in a vessel provided with a stirring device such as a mechanical stirrer, a magnetic stirrer, or the like, and mixing the components. Examples of a filtration method include centrifugal filtration, filter filtration, and the like.

2. Recording Method

An ink jet recording method according to the present embodiment is performed by using the ink jet ink composition. Specifically, the ink jet recording method includes ejecting and adhering the ink composition from an ink jet head to a recording medium. Next, a recording medium, an ink jet recording apparatus used in the recording method, and processes are described.

2. 1. Recording Medium

The recording medium is not particularly limited and may be one having a liquid-absorbing recording surface or one not having a liquid-absorbing recording surface. Examples of such a recording medium include paper, a film, a fabric, a metal, glass, and a polymer.

Examples of a raw yarn of a fabric include natural fibers of cotton, hemp, wool, silk, and the like; synthetic fibers of polypropylene, polyester, acetate, triacetate, polyamide, polyurethane, and the like; biodegradable fibers of polylactic acid and the like; and the like, and mixed fibers thereof may be used. The fabric described above may be in any desired form of the fibers, such as a woven fabric, a knitted fabric, a nonwoven fabric, or the like, or may be a mixture thereof. Because more excellent color development can be obtained, the raw yarn of the fabric is preferably cotton or silk and more preferably silk.

2. 2. Ink Jet Recording Apparatus

As an ink jet recording apparatus, either a serial type or a line type can be used. The ink jet recording apparatus of this type is provided with an ink jet head, and a predetermined image can be formed by ejecting a predetermined volume (mass) of droplets of the ink composition from nozzle holes of the ink jet head with predetermined timing and adhering the ink composition to the recording medium while changing the relative positional relation between the recording medium and the ink jet head.

The ink jet recording apparatus can arbitrarily use a known configuration, including for example, a drying unit, a roll unit, a winding device, and the like. The ink jet recording apparatus may include, for example, a transport unit which transports the recording medium, an image layer forming unit which records an image using the ink composition, a drying unit, and a whole drying unit which heats and blows air to a recording surface.

The transport unit includes, for example, a roller. In this case, the transport unit may include plural rollers. Another unit uses, for example, a method of transporting the recording medium by adhesion and adsorption to a belt or the like. The position and the number of transport units which can be provided can be arbitrarily selected as long as the recording medium can be transported. The transport unit may include a roll mechanism, a tray, and various platens.

The image layer forming unit records an image layer by ejecting the ink composition to the recording surface of the recording medium. The image layer forming unit includes an ink jet head provided with nozzles, and a nozzle line is assigned to each of predetermined compositions.

The drying unit can be used for heating and drying an image layer formed on the recording surface and/or removing volatile components on the recording medium. The drying unit may be provided at any desired position in consideration of timing of adhesion, the transport passage of the recording medium, and the like. Examples of the image layer drying unit include a method of applying heat to the recording medium by platen heating or the like, a method of blowing air to the image on the recording medium, and a method including a combination of these methods. Specific examples of the unit used in these methods include forcedair heating, radiation heating, conductive heating, high-frequency drying, and microwave drying.

2. 3. Each Process of Recording Method

The ink composition can be adhered to the recording medium by using the ink jet recording apparatus. That is, the ink composition can be adhered to the recording medium by filling the ink composition in the ink jet head so that it can be ejected from predetermined nozzles and, in this state, ejecting to the recording medium with predetermined timing.

The recording method may appropriately include heating the recording medium. For example, when the ink jet recording apparatus is used, heating can be performed by using the drying unit described above. Another drying unit may be appropriately used, and this is not limited to the ink jet recording apparatus. The recording method including heating can suppress blurring of an image and more efficiently fix the image.

The recording method may include other processes. Examples thereof include applying another composition, and washing.

The recording method uses the ink composition according to the present embodiment, and thus has the good clogging recovery property and can record an image having excellent color development and light resistance.

EXAMPLES

The present disclosure is described in further detail below by using examples and comparative examples. The present disclosure is not limited to these examples below.

1. Preparation of Coloring Material

Preparation of Coloring Materials 1 to 8

Coloring materials 1 to 8 were prepared by adjusting pH of commercial C. I. Reactive Black 8, ion-exchanging a heavy metal, and then purifying by microfiltration and ultrafiltration. Table 1 shows the mass ratio (compound (B)/compound (A)) of the compound (B) to the compound (A) and the mass ratio (compound (A)+compound (B)/compound (C)) of the compound (A) and the compound (B) to the compound (C) of each of the coloring materials 1 to 8. In addition, the mass ratio of the compound (B) to the compound (A) was calculated by XRF analysis, and the mass ratio of the compound (A) and the compound (B) to the compound (C) was calculated by LC-MS analysis.

Also, in the coloring materials 1 to 8, the compound (C) was a mixture of compounds having the structure represented by the formula (2). The coloring material 7 contained the compound (A) and the compound (C), but not contain the compound (B). The coloring material 8 contained the compound (B) and the compound (C), but not contain the compound (A).

2. Preparation of Ink Jet Ink Composition

Preparation of Examples 1 to 10 and Comparative Examples 1 to 4

Components were added to a tank for a mixture so as to provide compositions described in Table 2, mixed and stirred by a magnetic stirrer for 2 hours, and then filtered with a membrane filter having a pore diameter of 5 µm, preparing ink jet ink compositions according to examples and comparative examples. In Table 2, a numerical value represents "% by mass". Ion exchange water was used as water and added so that the mass of each of the inks was 100% by mass.

The components shown in Table 2 are as follows.

Coloring Material 1 to 8 . . . the coloring materials 1 to 8 prepared as described above RBk5 . . . C. I. Reactive Black 5 (commercial product)

ROr12 . . . C. I. Reactive Orange 12 (commercial product)

RR24:1 . . . C. I. Reactive Red 24:1 (commercial product)

Penetrant (Water-Soluble Organic Solvent) . . .

Triethylene glycol monobutyl ether

Moisturizer (Water-Soluble Organic Solvent)

Propylene glycol

Surfactant

PD-002W . . . Olfine (registered trademark) RD-002W (product name, Nissin Chemical Industry Co., Ltd.)

Preservative

XL-2 . . . Proxel (registered trademark) XL-2 (product name, Lonza Japan Ltd.)

TABLE 1

|  | Coloring material 1 | Coloring material 2 | Coloring material 3 | Coloring material 4 | Coloring material 5 | Coloring material 6 | Coloring material 7 | Coloring material 8 |
|---|---|---|---|---|---|---|---|---|
| Mass ratio (compound(A)/compound(B)) | 0.005 | 0.053 | 0.005 | 0.005 | 0.005 | 0.250 | Only compound A | Only compound B |
| Mass ratio ((compound(A) + compound(B))/compound(C)) | 19 | 19 | 4 | 3 | 99 | 19 | 19 | 19 |

TABLE 2

| | | | Example 1 | Example 2 | Example 3 | Example 4 | Example 5 | Example 6 | Example 7 | Example 8 |
|---|---|---|---|---|---|---|---|---|---|---|
| Ink jet ink composition (% by mass) | Coloring material | Coloring material 1 | 2 | | | | | 5 | 10 | 2 |
| | | Coloring material 2 | | 2 | | | | | | |
| | | Coloring material 3 | | | 2 | | | | | |
| | | Coloring material 4 | | | | 2 | | | | |
| | | Coloring material 5 | | | | | 2 | | | |
| | | Coloring material 6 | | | | | | | | |
| | | Coloring material 7 | | | | | | | | |
| | | Coloring material 8 | | | | | | | | |
| | | RBK5 | | | | | | | | |
| | | ROr12 | | | | | | | | 0.5 |
| | | PR24:1 | | | | | | | | 0.5 |
| | Penetrant (water-soluble organic solvent) | Triethylene glycol monobutyl ether | 5 | 5 | 5 | 5 | 5 | 5 | 5 | 5 |
| | Moisturizer (water-soluble organic solvent) | Propylene glycol | 5 | 5 | 5 | 5 | 5 | 5 | 5 | 5 |
| | Surfactant | PD-002W | 0.2 | 0.2 | 0.2 | 0.2 | 0.2 | 0.2 | 0.2 | 0.2 |
| | Preservative | XL-2 | 0.1 | 0.1 | 0.1 | 0.1 | 0.1 | 0.1 | 0.1 | 0.1 |
| | Pure water | | Balance | Balance | Balance | Balance | Balance | Balance | Balance | Balance |
| | Total | | 100 | 100 | 100 | 100 | 100 | 100 | 100 | 100 |

| | | | Example 9 | Example 10 | Comparative Example 1 | Comparative Example 2 | Comparative Example 3 | Comparative Example 4 |
|---|---|---|---|---|---|---|---|---|
| Ink jet ink composition (% by mass) | Coloring material | Coloring material 1 | 5 | 10 | | | | |
| | | Coloring material 2 | | | | | | |
| | | Coloring material 3 | | | | | | |
| | | Coloring material 4 | | | | | | |
| | | Coloring material 5 | | | | | | |
| | | Coloring material 6 | | | 2 | | | |
| | | Coloring material 7 | | | | 2 | | |
| | | Coloring material 8 | | | | | 2 | |
| | | RBK5 | | | | | | 2 |
| | | ROr12 | 0.5 | 0.5 | | | | |
| | | PR24:1 | 0.5 | 0.5 | | | | |
| | Penetrant (water-soluble organic solvent) | Triethylene glycol monobutyl ether | 5 | 5 | 5 | 5 | 5 | 5 |
| | Moisturizer (water-soluble organic solvent) | Propylene glycol | 5 | 5 | 5 | 5 | 5 | 5 |
| | Surfactant | PD-002W | 0.2 | 0.2 | 0.2 | 0.2 | 0.2 | 0.2 |
| | Preservative | XL-2 | 0.1 | 0.1 | 0.1 | 0.1 | 0.1 | 0.1 |
| | Pure water | | Balance | Balance | Balance | Balance | Balance | Balance |
| | Total | | 100 | 100 | 100 | 100 | 100 | 100 |

3. Evaluation Method
3. 1. Color Development

Each of the ink jet ink compositions of Examples 1 to 10 and Comparative Examples 1 to 4 was filled in a cartridge of ink jet printer PX-930G (product name, Seiko Epson Corporation). Then, each of the ink jet ink compositions was adhered to each of fabric 1 (cotton 100%) and fabric 2 (silk 100%) under the conditions including a resolution of 720 dpi×720 dpi and an ink ejection amount of 23 mg/inch$^2$, forming an image.

Each of the fabrics 1 and 2 having an image formed thereon was steamed at 102° C. for 10 minutes, then washed with an aqueous solution containing 0.2% by mass of Laccol STA (surfactant manufactured by Meisei Chemical Works, Ltd.) at 90° C. for 10 minutes, and then dried, producing a recorded product.

The color development of each of the resultant recorded products was evaluated. Specifically, the OD value of black of each of the resultant recorded products was measured by using a colorimeter (Gretag Macbeth Spectrolino, manufactured by X-Rite Inc.). The color development was evaluated based on the measured OD value according to evaluation criteria below. The results are shown in Table 3.

tion was reached was measured for each color, and the clogging recovery property was evaluated according to evaluation criteria below.

Evaluation Criteria
- A: Ejection is normal immediately after power is turned on, or ejection is normalized by 1 or more and 4 or less recovery operations.
- B: Ejection is normalized by 5 or more and 7 or less recovery operations.
- C: Ejection is normalized by 8 or more and 10 or less recovery operations.
- D: Ejection is normalized by 11 or more recovery operations.

3. 3. Light Resistance

The light resistance of the fabric 1 obtained in evaluation of the color development described above was measured according to ISO 105 B02, and the light resistance was evaluated according to evaluation criteria below. The results are shown in Table 3.

Evaluation Criteria
- A: The light resistance is grade 5 or higher.
- B: The light resistance is grade 4 or higher and lower than grade 5.
- C: The light resistance is lower than grade 4

TABLE 3

| | | | Example 1 | Example 2 | Example 3 | Example 4 | Example 5 | Example 6 | Example 7 | Example 8 | Example 9 |
|---|---|---|---|---|---|---|---|---|---|---|---|
| Evaluation results | Color development | Fabric 1 (cotton 100%) | A | A | A | B | A | A | A | A | A |
| | | Fabric 2 (silk 100%) | A | A | A | B | B | A | A | A | A |
| | Clogging recovery property | | A | A | A | A | A | A | B | A | A |
| | Light resistance | | A | A | A | A | A | A | A | A | A |

| | | | Example 10 | Comparative Example 1 | Comparative Example 2 | Comparative Example 3 | Comparative Example 4 |
|---|---|---|---|---|---|---|---|
| Evaluation results | Color development | Fabric 1 (cotton 100%) | A | C | C | A | B |
| | | Fabric 2 (silk 100%) | A | C | C | B | B |
| | Clogging recovery property | | B | C | D | A | C |
| | Light resistance | | A | A | A | B | C |

Evaluation Criteria
- A: The OD value is 0.75 or more.
- B: The OD value is 1.65 or more and less than 0.75.
- C: The OD value is 1.50 or more and less than 0.65.

3. 2. Clogging Recovery Property

Each of the ink jet ink compositions of Examples 1 to 10 and Comparative Examples 1 to 4 was filled in a cartridge of ink jet printer PX-H6000 (produce name, Seiko Epson Corporation). Then, normal ejection from all nozzles of the ink jet printer with no clogged nozzles was confirmed, and then the power of the printer was turned off in a normal state. In this state, the printer was allowed to stand for 1 month in an environment of 40° C.

The number of times of recovery operations, including all-color simultaneous suction, required until normal ejec- Table 3 indicates that the ink composition of the present embodiment has excellent color development and light resistance, and can suppress nozzle clogging and can improve the clogging recovery property even when the head is dried after long-term storage.

Also, comparison between Examples 3 and Examples 4 and 5 indicates that when the coloring material contains the compound (C) in combination with the compound (A) and the compound (B) at a mass ratio (compound (A)+compound (B)/compound (C)) within a specific range, there is a tendency that the ink composition has more excellent light resistance and clogging recovery property, and more excellent color development for cotton and silk fabrics. In particular, the color development for silk tends to be even more excellent.

Comparison between Examples 1 and 6 and Example 7 and comparison between Examples 8 and 9 and Example 10 indicate that when the content of the coloring material is within a specific range, the ink composition having more excellent color development and light resistance and having even more excellent clogging recovery property can be obtained.

What is claimed is:

1. An ink jet ink composition comprising:
a coloring material;
a water-soluble organic solvent; and
water, wherein
the coloring material contains a compound (A) having Cr as Me in a structure represented by formula (1) below, and a compound (B) having Co as Me in the structure represented by the formula (1) below; and
the mass ratio of the compound (B) to the compound (A) is over 0 and 0.06 or less

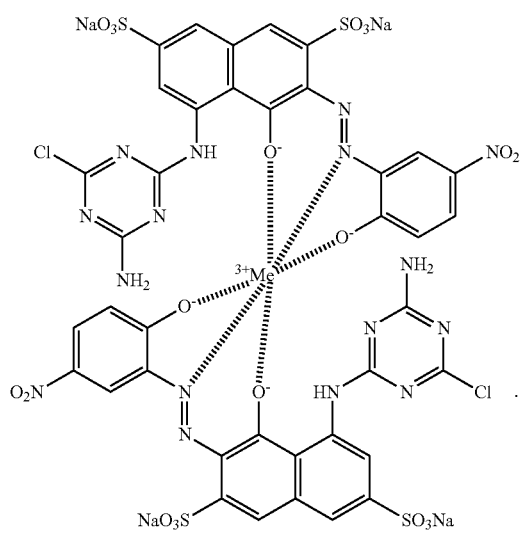

2. The ink jet ink composition according to claim 1, wherein the mass ratio is 0.005 or more and 0.06 or less.

3. The ink jet ink composition according to claim 1, wherein,
the coloring material further contains a compound (C) having a structure represented by formula (2) below; and
the mass ratio of the compound (A) and the compound (B) to the compound (C) is 4 or more and 20 or less,

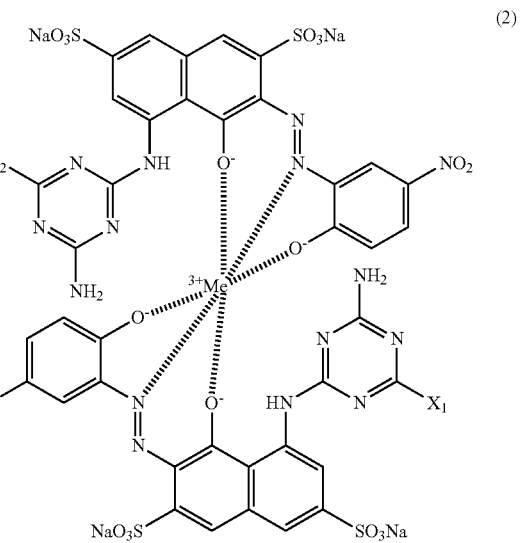

in the formula (2), Me is Cr or Co, and $X_1$ and $X_2$ are each independently a chlorine atom or an amino group, but $X_1$ and $X_2$ are not simultaneously chlorine atoms.

4. The ink jet ink composition according to claim 1, wherein the content of the coloring material relative to the total amount of the ink jet ink composition is 5% by mass or less.

5. The ink jet ink composition according to claim 1, further comprising one or more selected from the group consisting of C. I. Reactive Orange 12 and C. I. Reactive Red 24:1.

* * * * *